(12) United States Patent  
Black et al.

(10) Patent No.: US 12,551,413 B2  
(45) Date of Patent: *Feb. 17, 2026

(54) ADJUSTABLE BOTTLE HOLDER AND USE THEREOF

(71) Applicant: Zedco Enterprises Inc., Huntington, NY (US)

(72) Inventors: Patrick Black, Huntington, NY (US); Zoe Black, Huntington, NY (US); Michael Paloian, Oyster Bay, NY (US); Anthony Orchard, Oyster Bay, NY (US); Joe Toro, Hauppauge, NY (US)

(73) Assignee: Zedco Enterprise Inc., Huntington, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/224,294

(22) Filed: Jul. 20, 2023

(65) Prior Publication Data

US 2023/0363980 A1 Nov. 16, 2023

Related U.S. Application Data

(63) Continuation of application No. 17/234,395, filed on Apr. 19, 2021, now Pat. No. 11,707,417, which is a continuation of application No. 16/684,837, filed on Nov. 15, 2019, now Pat. No. 10,993,886.

(60) Provisional application No. 62/897,067, filed on Sep. 6, 2019, provisional application No. 62/768,828, filed on Nov. 16, 2018.

(51) Int. Cl.
*A61J 9/06* (2006.01)

(52) U.S. Cl.
CPC .......... *A61J 9/0661* (2015.05); *A61J 9/0638* (2015.05)

(58) Field of Classification Search
CPC .............................. A61J 9/0661; A61J 9/0638
See application file for complete search history.

(56) References Cited

U.S. PATENT DOCUMENTS

| | | | |
|---|---|---|---|
| 1,232,690 A | 7/1917 | Keenan |
| 2,258,076 A | 10/1941 | Taylor |
| 2,272,319 A | 2/1942 | Michael |
| 2,412,426 A | 12/1946 | Michael |
| 2,442,779 A | 6/1948 | Oriold |
| 2,470,694 A | 5/1949 | Lee |
| 2,474,050 A | 6/1949 | Harris |

(Continued)

OTHER PUBLICATIONS

Photograph of Babaste bottle holder from Zedco Enterprises Inc. (applicant) that was first offered for sale in Jul. 2018. 1 page.

*Primary Examiner* — Anita M King
(74) *Attorney, Agent, or Firm* — Koffsky Schwalb LLC

(57) ABSTRACT

A bottle holder, which is secured on a supporting surface, comprises a receiving base and a telescoping shaft inserted into the receiving base. A portion of the shaft is elastic, such that it can be flexed (bent and/or twisted) to a comfortable close position of the bottle, held by the bottled holder, to the user who will be consuming the bottle's contents, without the aid or assistance of another individual. When the user finishes drinking from the bottle and releases the bottle, the shaft springs (snaps) back to its initial, unbiased position, where the supported bottle is angled upwards in such a way that any contents left in the bottle will not spill.

20 Claims, 18 Drawing Sheets

(56) References Cited

U.S. PATENT DOCUMENTS

| | | | |
|---|---|---|---|
| 2,481,271 A | 9/1949 | Willey | |
| 2,483,395 A | 10/1949 | Benson | |
| 2,784,261 A | 3/1957 | Anklesaria | |
| 2,881,999 A | 4/1959 | Herman | |
| 2,912,200 A | 11/1959 | Reinhorn | |
| 2,989,278 A | 6/1961 | Alvin | |
| 4,156,391 A | 5/1979 | Ubezio | |
| 4,458,870 A | 7/1984 | Duncan | |
| 4,569,499 A * | 2/1986 | Seely | E01F 9/688 40/608 |
| 4,706,915 A | 11/1987 | Cindric | |
| 4,869,381 A | 9/1989 | Agner | |
| 5,098,049 A | 3/1992 | Van Vlaardingen | |
| 5,192,041 A | 3/1993 | Bryant | |
| 5,937,537 A | 8/1999 | Miller | |
| 6,073,788 A | 6/2000 | Stroud | |
| 6,199,805 B1 | 3/2001 | Pena | |
| 6,343,807 B1 | 2/2002 | Rathbun | |
| 6,568,643 B2 | 5/2003 | Black | |
| 7,007,908 B2 * | 3/2006 | Tsay | G11B 33/00 248/205.5 |
| 9,089,234 B2 * | 7/2015 | Webb | A47G 23/02 |
| D852,967 S | 7/2019 | Wilson | |
| 10,993,886 B2 | 5/2021 | Black | |
| 2007/0018064 A1 * | 1/2007 | Wang | F16M 13/022 224/42.32 |
| 2022/0211584 A1 | 7/2022 | Black | |

\* cited by examiner

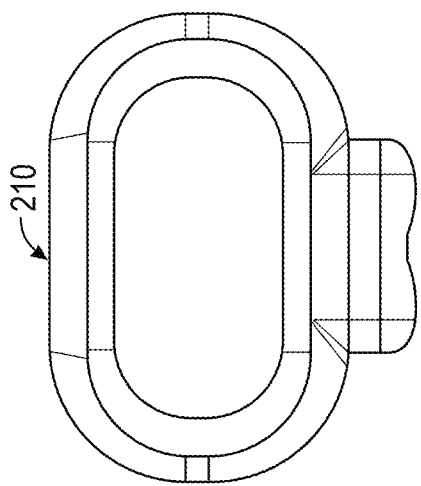
FIG. 27
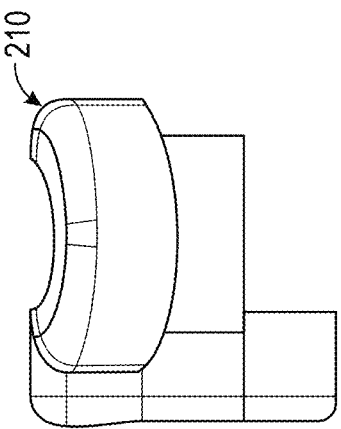
FIG. 29
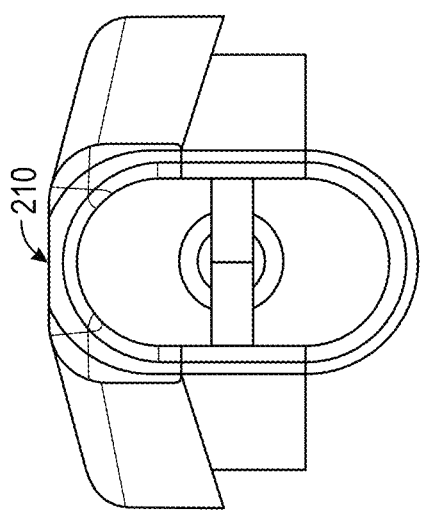
FIG. 26
FIG. 28
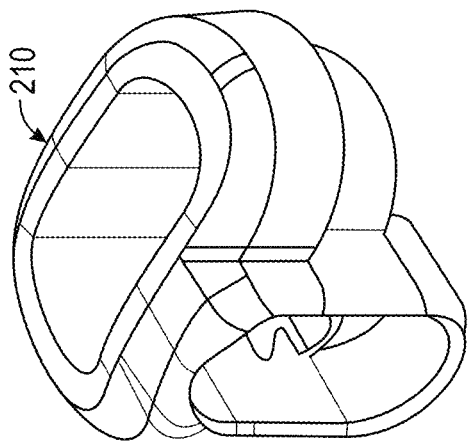
FIG. 25

ADJUSTABLE BOTTLE HOLDER AND USE THEREOF

REFERENCE TO PRIOR APPLICATIONS

This application is a continuation of U.S. patent application Ser. No. 17/234,395, filed on Apr. 19, 2021, which a continuation of U.S. patent application Ser. No. 16/684,837, filed on Nov. 15, 2019, and issued as U.S. Pat. No. 10,993, 886, which claims the benefit of the following two provisional applications, each of which is hereby incorporated by reference in its entirety, and no portion of the disclosures of the following two applications is being disclaimed herein:
1) U.S. Provisional Application Ser. No. 62/768,828 filed on Nov. 16, 2018; and
2) U.S. Provisional Application Ser. No. 62/897,067 filed on Sep. 6, 2019.

FIELD OF THE DISCLOSURE

The present invention relates generally to devices designed to support feeding bottles. More specifically, it relates to a baby bottle supporting device that can be secured on a supporting surface for easy access of the baby bottle by its intended user. The intended user could be a baby capable of sitting up, a small child, or any individual, whether adult or not, who might need help with feeding.

SUMMARY

The inventive baby bottle supporting device (baby bottle holder) can be secured on a supporting surface for easy access of the baby bottle by its intended user. The device can be placed in close proximity to the user. Its height is adjustable in order to accommodate the user. The device comprises a shaft, a portion of which is elastic, such that is can be bent and/or twisted to a comfortable close position of the bottle held by the device to the user, who will be consuming the bottle's contents, without the aid or assistance of another individual. When the user finishes drinking from the bottle, the user can release the inventive device, by releasing the bottle, which upon release springs (snaps) back to its initial, unbiased position, where the supported bottle is angled upwards in such a way that any contents left in the bottle will not spill.

The present invention addresses some of the issues with the prior art bottle-holding devices, such as the device disclosed in U.S. Pat. No. 6,568,643 by Patrick Black, one of the inventors of the present invention, the contents of which are incorporated by reference herein.

For example, the bottle holder of the prior art U.S. Pat. No. 6,568,643 patent included a holder pin and a separate hardware spring for actuating and biasing the bottle supporting platform situated on a completely rigid shaft. Because spring loses its torque over time, this in turn could lead to the disassembly of the device and create a possible choking hazard to its user.

The present invention overcomes the risk of a choking hazard by eliminating a separate biasing spring and holder pin. It also reduces manufacturing costs associated with the prior art bottle holder by reducing the number of the device's components.

For example, the present invention overcomes the problem of the prior art by having a shaft that comprises an elastic flexible portion, thus eliminating the need for a separate, hardware biasing spring and its holder pin. The elastic portion of the shaft of invented bottle holder may be twisted to allow rotation of the feeding bottle around the shaft's axis, bent to allow a translation of the feeding bottle in the X-Z plane, away from the shaft axis, or both.

In accordance with the present invention, there is provided an adjustable bottle holder comprising a receiving base and a telescoping shaft inserted into, or mechanically coupled to, the receiving base.

In one embodiment, the receiving base includes a stand and a vertically oriented stem that is attached to the stand. The stem has a lower end, an upper end, a through-bore, a front face, a back face. The stem may further include a slider cap, a stainless-steel spring, and a button. The stand may also include a flange with a center opening, for accommodating the lower end of the stem. The receiving base may also include a bottom cover having an upper surface and a bottom ribbed surface. The bottom cover is inserted into the lower end of the stem, such that it is flush with the bottom edge of the through-bore at the stem's lower end. The cover's bottom ribbed surface faces outward and away from the through-bore to act as a foundation (base structure) for an over-mold suction cup, fixedly attached over the flange and throughout the entire ribbed surface of the bottom cover.

In one embodiment, the telescoping bottle supporting shaft has a hard (rigid) end, a flared cradle-shaped soft and hard upper end, and an elastic neck portion in between, with at least one slot or rib provided in the neck. The neck with at least one slot, preferably with a multiplicity of slots, is made of an elastic material that can provide the biasing force (acting as a biasing spring) if the neck is bent or twisted from its resting (unbiased) position. In one preferred embodiment the material is a thermoplastic elastomer ("TPE"). The TPE is also over-molded to the hard (rigid) end of the telescoping shaft below the neck portion, and to the hard, flared cradle-shaped bottle rest at the top end of the shaft (above the neck portion).

The flared cradle-shaped rest is not in a horizontal plane. Rather, it is angled upwardly and is equipped with attachment elements, e.g., two hooks, for a bottle securing cover, such as a strap. In one embodiment, one of the hooks (see, e.g., Ref. 344 in FIGS. 5, 14, and 15) is located in a slot through which a bottle securing strap is threaded and securely anchored to the hook, to form a pivot hinge for the strap. The other strap end, which is provided with a series of receiving openings, can be attached to the second hook (see, e.g., Ref. 342 in FIGS. 5, 14, and 15) to adjustably secure the feeding bottle onto the cradle shaped upper end of the shaft. The strap openings allow the strap to secure feeding bottles of varying diameters and shapes.

In use, the bottom end of the telescoping shaft is inserted into the through-bore of the stem of the receiving base, such that the bottle supporting shaft is itself supported by, and can adjustably telescope vertically in and out of, the receiving base, to position the cradle-held bottle at any height.

The suction cup, which is a part of the stand of the receiving base, allows for the placement of the adjustable bottle holder anywhere on the supporting surface that is close to the user, who can then bring the bottle, cradled by the invented bottle holder, to a comfortable drinking position by bending and/or twisting the elastic neck of the shaft. Upon release, the adjustable bottle holder can snap back to an upper angled, unbiased, position to prevent spillage of the contents of the bottle.

The invention contemplates attaching the adjustable bottle holder to a supporting surface by ways other than suction. For example, the invention contemplates a C-clamp type stand that is detachably affixed to the supporting surface from the bottom by a screw. Such C-clamp stand could be used in situations where the supporting surface is not sufficiently flat to allow for suction hold.

The invention also contemplates using a stand with a magnetic bottom surface or having a magnet at the bottom. Such an attachment could be used in situations when the supporting surface is metallic.

In addition, the inventive baby bottle supporting device can be designed to be fully disassemblable, such that it could be used in portable applications, and in applications where storage space is at a premium. In such an embodiment, the stem is detachable from the stand of the receiving base, and instead can be considered apart of the adjustable telescoping shaft. The shaft would thus comprise at least two separable sections, with at least one hard (rigid) section and at least one telescoping section, where a telescoping section includes a portion that can be bent or twisted by a user, yet returned to its regular shape when the user releases the device. As a result, not only can the shaft be detached from the stand of the receiving base, but the shaft itself could be disassembled, regardless whether it has two sections or more. In such a situation, the inventive baby bottle supporting device can be assembled, used, and then fully disassembled for cleaning, storage and/or transport.

When the receiving base includes a stand and a stem, the lower surface of the stand forms the lower end of the receiving base and the upper end of the stem forms the upper end of the receiving base.

When the receiving base includes only the stand, such as in the disassemblable configuration, the lower surface of the stand forms the lower end of the receiving base and the upper end of the stand forms the upper end of the receiving base.

On one embodiment, the invented bottle holder comprises a receiving base configured for detachable affixing to a supporting surface; a shaft attached to the base, the shaft comprising an elastic portion; a bottle rest located at an upper end of the shaft and above the elastic portion, the bottle rest configured to receive a feeding bottle; and a fastener configured to secure the feeding bottle to the bottle rest of the bottle holder, effectively securing the bottle to the bottle holder. The elastic portion, which can be alternatively described as a resilient portion, may be twisted to allow rotation of the feeding bottle around a shaft axis. The elastic portion may also be bent to allow titling of the with respect to the shaft axis. The elastic portion can be both twisted and bent at the same time.

In one embodiment of the invention, the shaft can be detachable from the receiving base.

In one embodiment of the invention the shaft is movable vertically with respect to the base (for example, by telescoping in and out of the receiving base), such that the height of the bottle rest over the supporting surface, i.e., the height of the bottle holder, can be adjusted. To enable height adjustments, the bottle holder comprises a locking mechanism. In one embodiment, the locking mechanism comprises a locking ring that is coupled to the shaft. In another embodiment, the locking mechanism comprises a button.

The base can be configured to detachable affix to the supporting surface via various methods. For example, by suction, magnetic field or a screw.

In another embodiment, the bottle holder comprises a receiving base having an upper end and a lower end, the lower end configured for detachable affixing to a supporting surface; telescoping shaft detachable attached to the receiving base, the telescoping shaft comprising a rigid section and another section having an elastic portion; a bottle rest located above the elastic portion and configured to receive a feeding bottle; and a fastener configured to secure the feeding bottle to the bottle rest of the bottle holder, effectively securing the bottle to the bottle holder. Similar to the embodiment mentioned above, the elastic portion can be twisted and or bent.

In one embodiment, an elastic portion comprises at least one slot. In another embodiment, at least one of two pairs of opposing surfaces of the elastic portion (e.g., front-back pair of surfaces, left-right pair of surfaces) comprises at least one slot in each of the opposing surfaces.

In one embodiment, the telescoping shaft includes at least one locking mechanism (e.g., a locking ring or a button) for adjusting the shaft's height.

In an unbiased condition of the elastic portion of the shaft, the bottle rest is configured to hold a feeding bottle at an upwardly inclined angle, such that the front of the bottle is above the rear of the bottle, to prevent spillage of the bottle's contents.

In one embodiment, the bottle fastener comprises at least one stretchable strap. In another embodiment, the bottle fastener comprises a bottle securing stretchable cover.

The invention also provides a method of using a bottle holder comprising a receiving base, a bottle fastener, and a telescoping shaft having an elastic portion and a bottle rest above the elastic portion. In one embodiment, the method comprises the steps of affixing the receiving base to a supporting surface, coupling the telescoping shaft to the receiving base, securing a feeding to the bottle rest using the fastener, adjusting a height of the telescoping shaft, and flexing the elastic portion of the telescoping shaft to reorient the feeding bottle. The steps need not necessarily be performed in the specific order listed above.

In one embodiment, the height adjusting step (the step of adjusting a height of the telescoping shaft) comprises the step of moving the elastic portion of the shaft vertically with respect to the receiving base along the shaft's axis.

In one embodiment, the invented method comprises the step of using a locking mechanism to secure a vertical position of the flexible portion of the shaft above the receiving base once the desired height of the bottle holder has been attained.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

FIG. 25 is a three-dimensional perspective of an embodiment of the slider cap of the receiving base of the invented adjustable bottle holder of FIG. 1;

FIG. 26 is a front plan view of an embodiment of the slider cap of the receiving base of the invented adjustable bottle holder of FIG. 1;

FIG. 27 is a top plan view of an embodiment of the slider cap of the receiving base of the invented adjustable bottle holder of FIG. 1;

FIG. 28 is a bottom plan view of an embodiment of the slider cap of the receiving base of the invented adjustable bottle holder of FIG. 1;

FIG. 29 is a side plan view of an embodiment of the slider cap of the receiving base of the invented adjustable bottle holder of FIG. 1;

Figure 1:
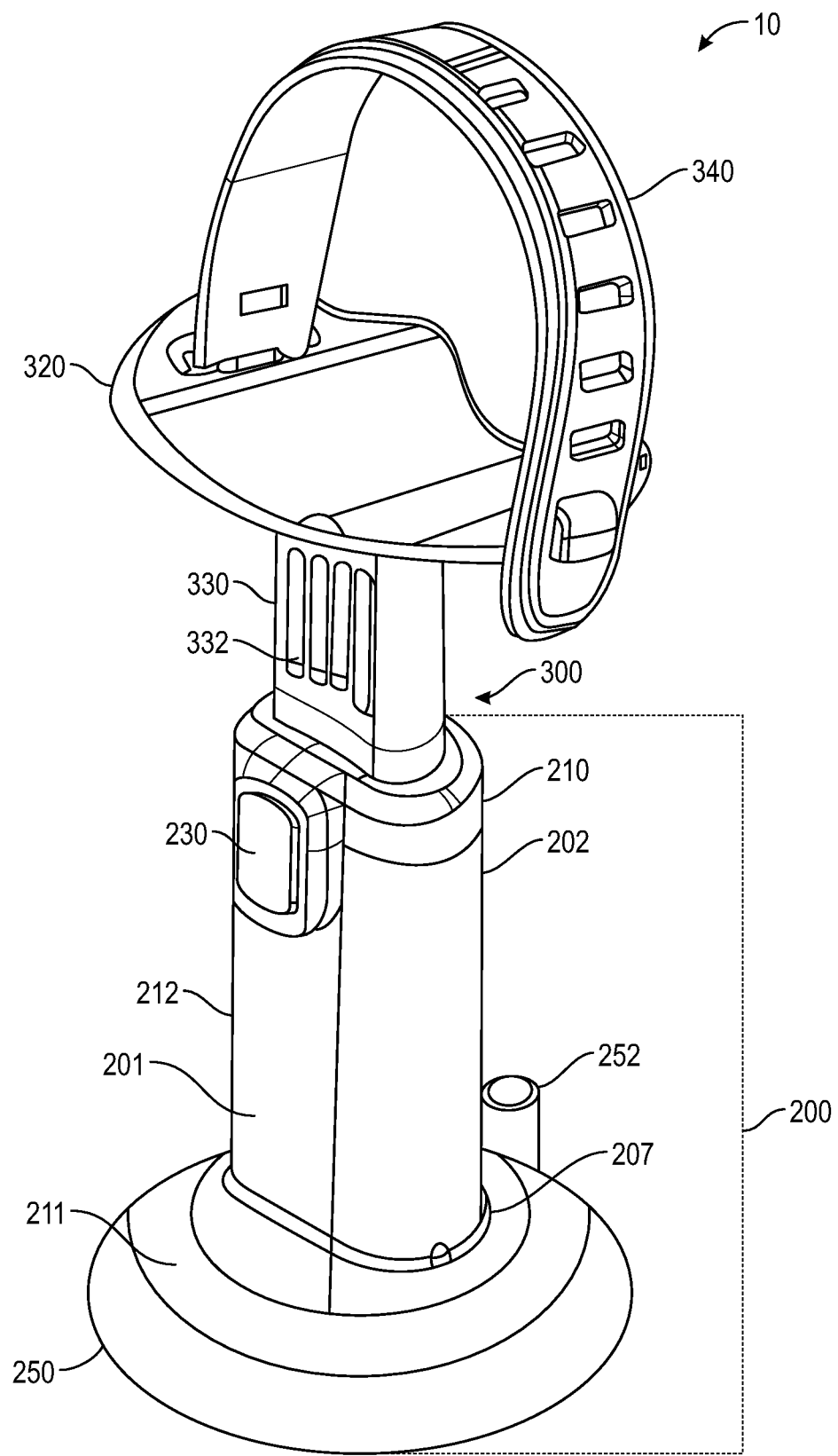
FIG. 1 is a three-dimensional perspective view of an embodiment of the invented adjustable bottle holder.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The following detailed description discloses some embodiments of the present invention.

Figure 3:
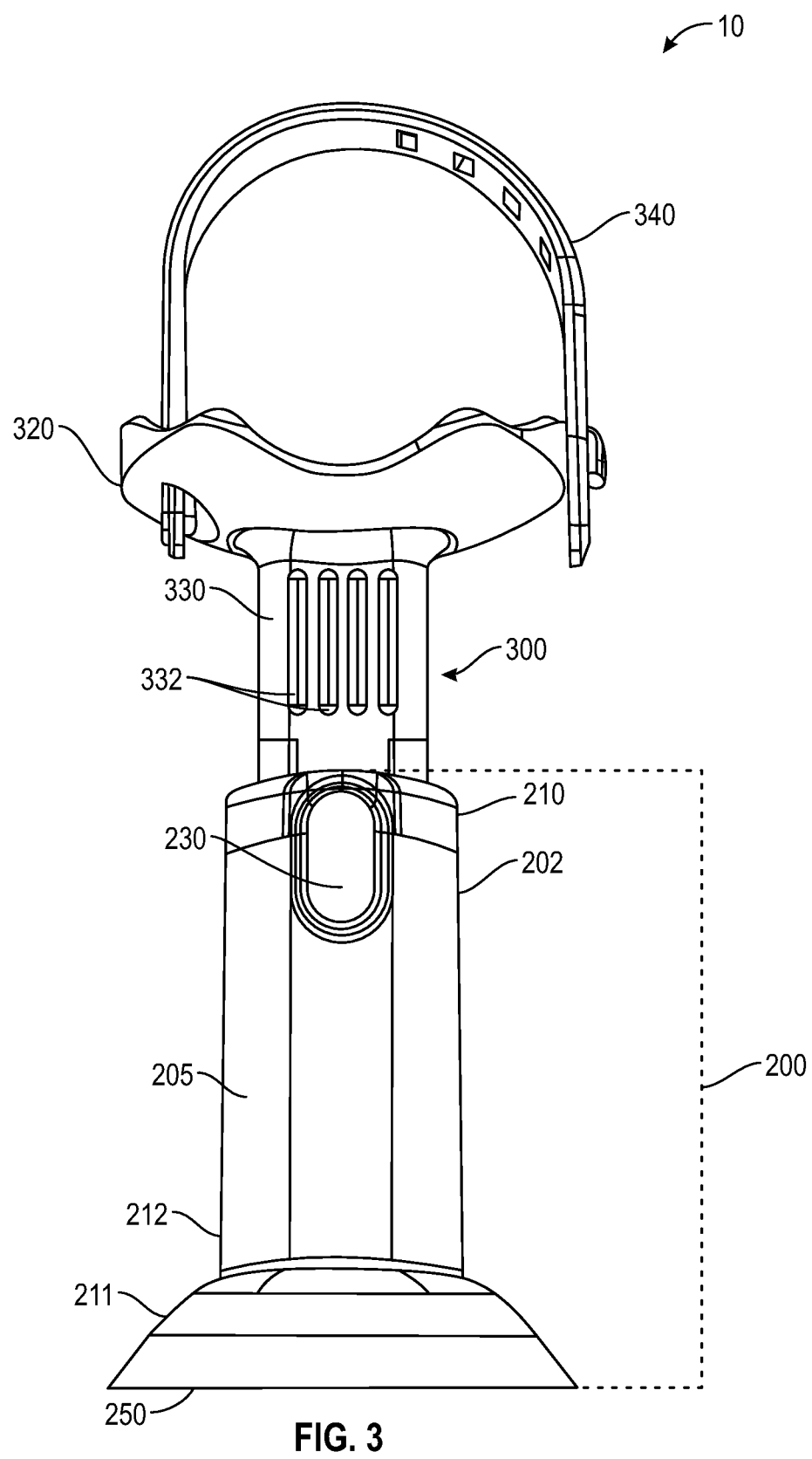
FIG. 3 is a front plan view of an embodiment of the invented adjustable bottle holder of FIG. 1.
Figure 4:
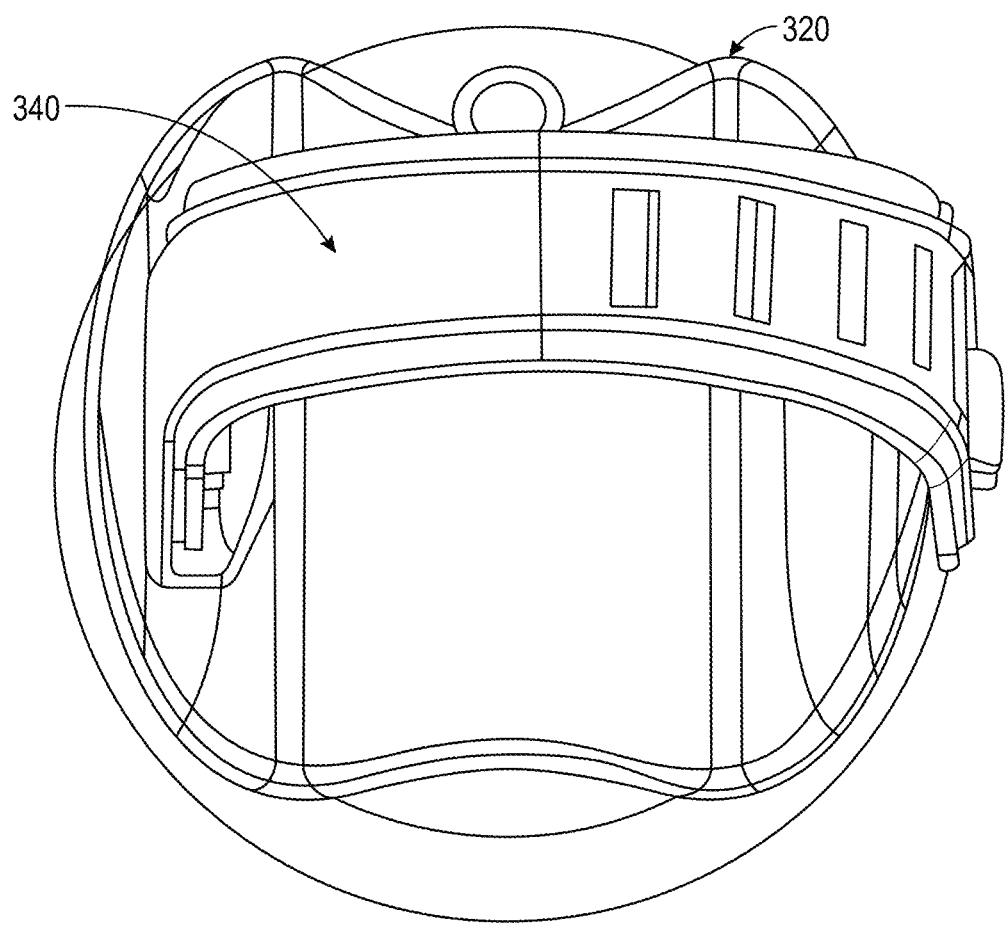
FIG. 4 is a top plan view of an embodiment of the invented adjustable bottle holder of FIG. 1.
Figure 5:
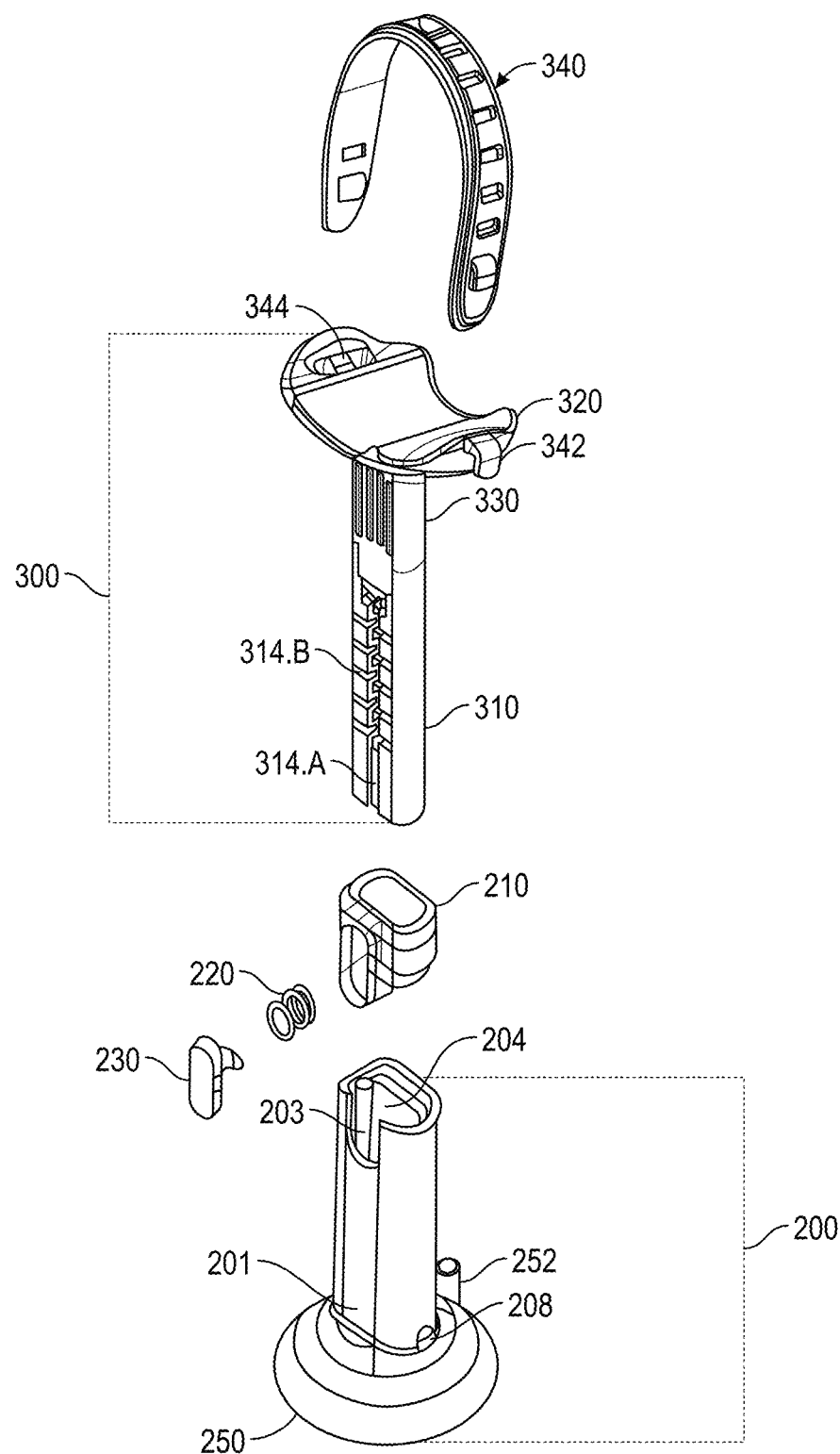
FIG. 5 is an exploded three-dimensional perspective view of an embodiment of the invented adjustable bottle holder of FIG. 1.
Figure 6:
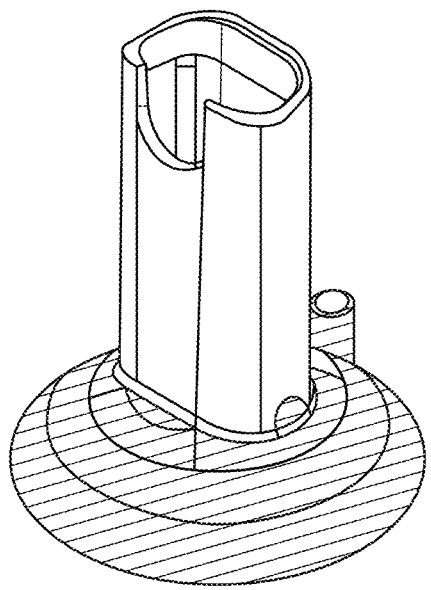
FIG. 6 is a three-dimensional perspective view of an embodiment of the receiving base of the invented adjustable bottle holder of FIG. 1.
Figure 7:
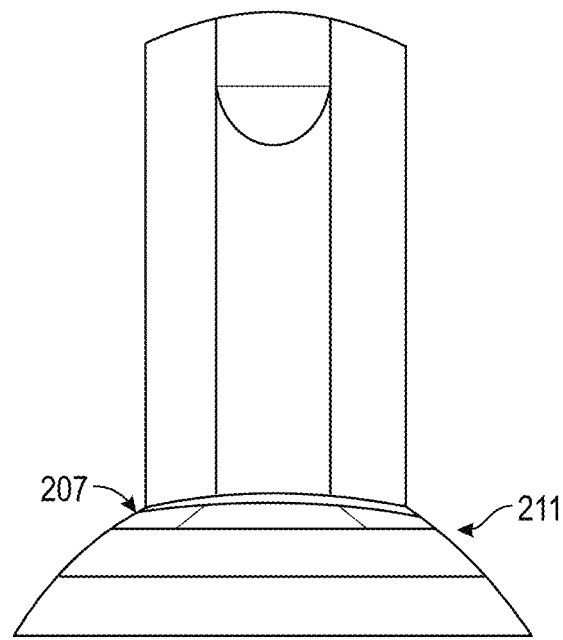
FIG. 7 is a front plan view of an embodiment of the receiving base of the invented adjustable bottle holder of FIG. 1.
Figure 8:
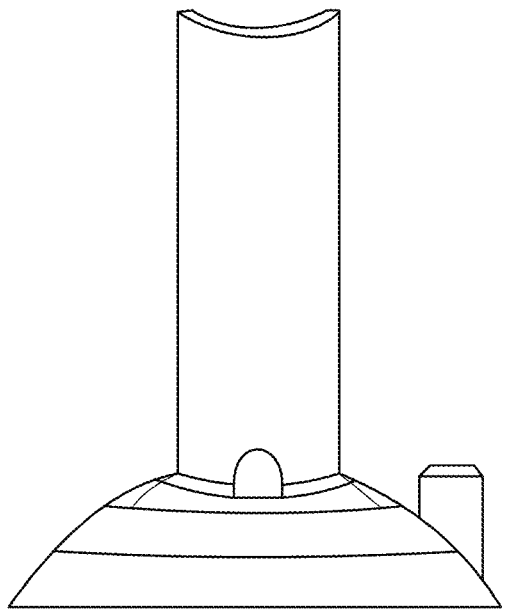
FIG. 8 is a side plan view of an embodiment of the receiving base of the invented adjustable bottle holder of FIG. 1.
Figure 9:
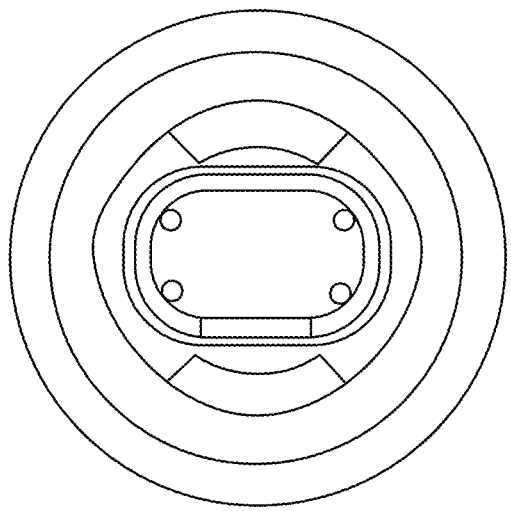
FIG. 9 is a top plan view of an embodiment of the receiving base of the invented adjustable bottle holder of FIG. 1.
Figure 10:
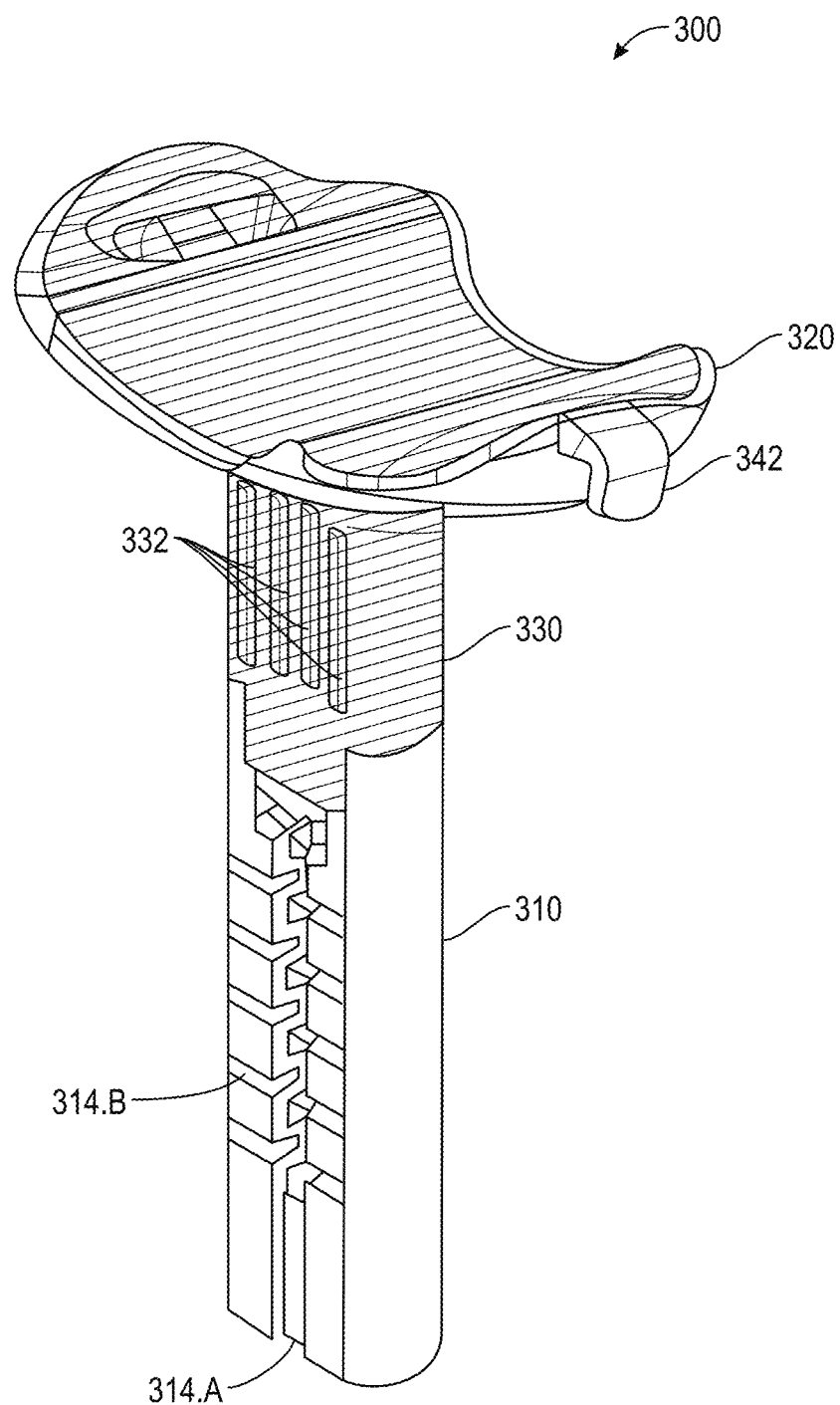
FIG. 10 is a three-dimensional perspective view of an embodiment of the telescoping shaft of the invented adjustable bottle holder of FIG. 1.

One embodiment of the invented adjustable bottle holder is generally depicted in FIGS. 1-5, with FIG. 5 depicting an exploded three-dimensional perspective view of an embodiment of the invented adjustable bottle holder of FIG. 1.

FIG. 1 shows a three-dimensional perspective view of the invented adjustable bottle holder 10. The invented device can be secured to a supporting surface and, in turn, support a feeding bottle for easy access to the feeding bottle by its intended user. The intended user could be a baby capable of sitting up, a small child, or any individual, whether adult or not, who might need help with feeding. The inventive adjustable bottle holder can be placed in close proximity to the user. Its height can be adjusted per user's needs. Importantly, the invented device includes a flexible portion, that allows for bending, twisting, or both in order to enable bringing the feeding bottle in proper position and orientation with respect to the user who is consuming the bottle's contents, without the aid or assistance of another individual. When flexed, the flexible portion provides a biasing force to return the shaft to its original, unbiased position, i.e., the flexible portion is elastic. When the user has finished drinking from the bottle, the user can let go of the bottle and the adjustable bottle holder, which, upon release, can spring (snap) back to its original unbiased position, with the supported feeding bottle angled upwards in such a way that any contents left in the bottle will not spill.

As shown in FIG. 1, in one embodiment of the invention the adjustable bottle holder 10 comprises a receiving base 200 and a shaft 300 inserted into and supported within the receiving base 200. The receiving base includes a stand 211 and a stem 212 that is connected to the stand 211.

As shown in FIG. 1, the stem 212 has through-bore, into which the shaft 300 in inserted, a lower end, an upper end, a front face, a back face, and further includes a slider cap, a stainless spring, and a button.

The stand 211 includes a circular flange 207 with a center opening, for accommodating the lower end of the stem 212, and a bottom cover 240 (see, e.g., FIGS. 16-20). The bottom cover 240 may have an upper surface and a bottom ribbed surface (see, e.g., FIGS. 18 and 19, respectively). The bottom cover 240 is inserted onto the lower end of the stem 212, such that it is flush with the bottom edge of the through-bore 204 at the lower end 201 of the stem 212 and the cover's bottom ribbed surface faces outward and away from the through-bore, to act as a foundation for an over-mold suction cup 250 fixedly attached over the flange 207 and throughout the entire ribbed surface of the bottom cover 240 that is inserted in the lower end of the stem.

Once the receiving base 200 has been affixed to a supporting surface (e.g., table, desk, baby chair, etc.), the bottle supporting shaft 300 is capable of adjustable, but fixedly, telescoping in and out of the stem 212 of the receiving base 200. This allows the user, or any person assisting the user, to adjust the height of the invented adjustable bottle holder to whatever height is necessary for the user to access the bottle and its contents, supported by the adjustable bottle holder 10.

As shown in FIG. 1, the shaft 300 includes a flexible portion 330 (referred to as a neck portion), that may include one or more slots 332 formed therein. The neck portion 330 is formed of an elastic material, e.g., TPE, that provides a biasing force when flexed (bent, twisted, or both). The slots 332 provide the neck portion 330 with additional flexibility. The part of the shaft below the neck portion, indicated in FIG. 5 by reference numbered 310, is hard (rigid). Above the neck portion 330, the shaft includes a flared cradle-shaped upper end 320. The neck portion 330 is coupled to the rigid part of the shaft 310 below and to the flared cradle-shaped upper end 320 of the shaft above by, for example, over-molding, using the same material as in the neck portion. (This is shown by cross-hatching in FIGS. 10-13.) A stretchable strap 340, which secures the bottle to the invented device by fastening, is also shown in FIG. 1.

As discussed above, the receiving base 200 includes a stem 212 having a lower end 201, upper end 202, and a through-bore 204 (see, e.g., FIG. 5) into which the rigid portion 310 of the telescoping bottle supporting shaft 300 is inserted. The shape of the stem 212 of the receiving base 200 is not limited to the shape shown in FIG. 1, but could be round, tubular, rectangular, square, etc.

As long the height of the bottle holder can be adjusted, however, the invention is not limited as to how the shaft is coupled to the stem. For example, the invention contemplates an embodiment where the stem is inserted into the shaft, i.e., the through-bore is in the shaft. Moreover, the invention also contemplates embodiments without a through-bore, where, instead of insertion, the shaft and stem are merely slidably coupled to each other side-by-side.

Returning to the embodiment of the device shown in FIG. 1, the stand 211 is coupled to the lower end of the stem 212 and comprises an over-molded suction cup 250 for securing the adjustable bottle holder to a supporting surface. (This is shown by cross-hatching in FIG. 6.) The over-molded suction cup 250 is provided with a suction-seal-releasing tab 252, which during use of the adjustable bottle holder 10 could be pulled on to quickly break the suction seal between the adjustable bottle holder 10 and its supporting surface for easy removal. FIGS. 6-9 show the stand 211 and stem 212 parts of the receiving base 200 in more detail.

Although the embodiment in FIG. 1 depicts the stand 211 as having a circular shape, depending on the method of securement of the adjustable bottle holder 10 to the supporting surface, other shapes, e.g., square, rectangular, etc., could be used.

One or more drain holes 208 may be located at the lower end of the stem 212. At its upper end, the stem 212 may further comprise a slider cap 210 and a button 230, the latter for use during height adjustments of the invented bottle holder. Although the slider cap 210 and the button 230 are being described as parts of the stem 212, they may be considered as separate elements that are coupled to the stem 212 during manufacture of the device.

Figure 2:
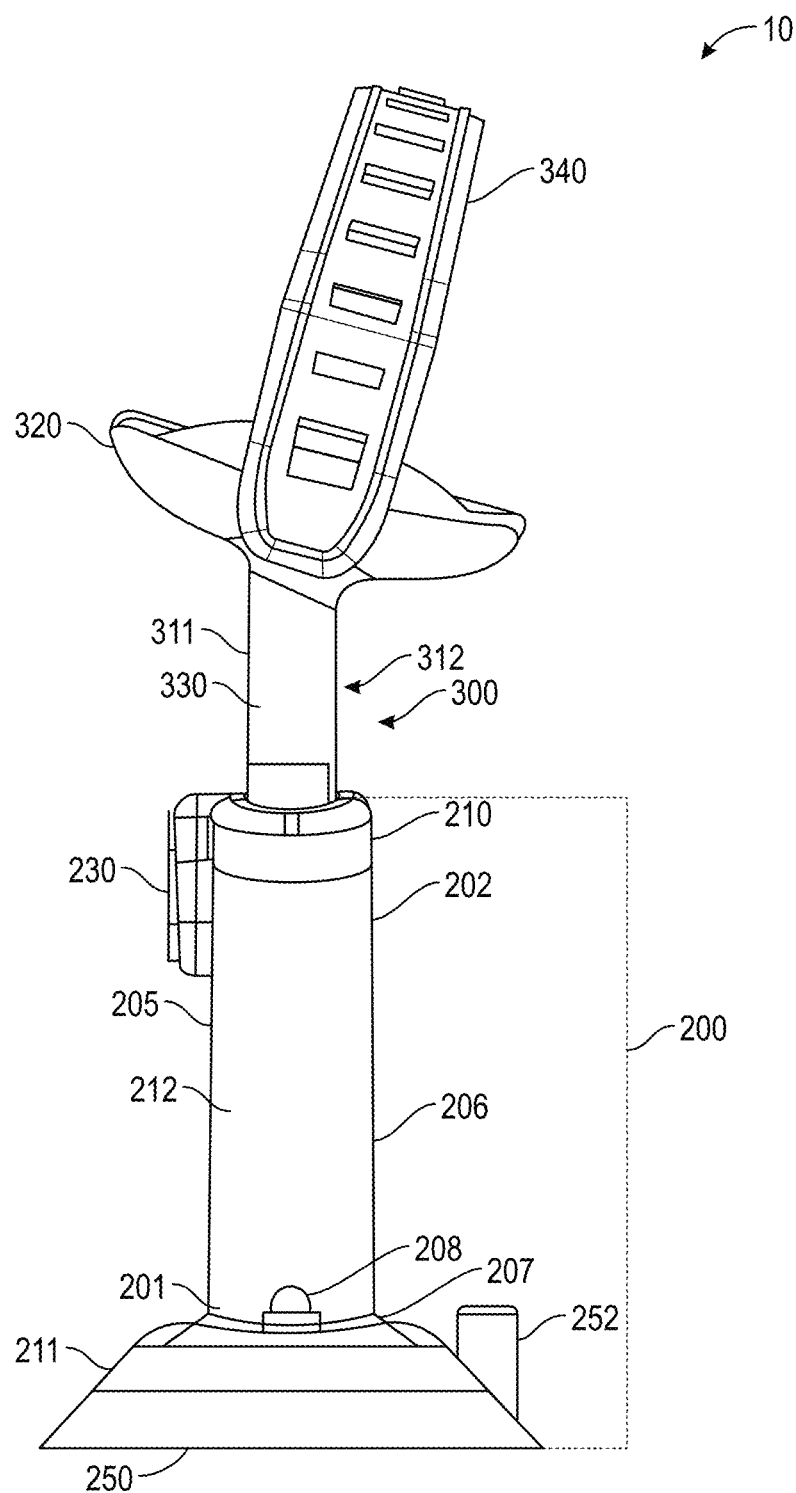
FIG. 2 is a side plan view of an embodiment of the invented adjustable bottle holder of FIG. 1.

FIG. 2 is a side plan view of an embodiment of the invented adjustable bottle holder of FIG. 1. It shows that the receiving base, which includes the stand 211 and stem 212, has a front face 205 and a back face 206, and also shows that the shaft 300 has a front face 311 and a back face 312.

FIG. 3 shows a front plan view of an embodiment of the invented adjustable bottle holder of FIG. 1. It illustrates the slots 332 in the neck portion 330 of the shaft 300, and also illustrates in more detail the button 230 and its location in the front face of the bottle holder.

FIG. 4 is a top plan view of an embodiment of the invented adjustable bottle holder of FIG. 1. It shows the strap 340 over the flared cradle-shaped upper end 320 of the shaft 300.

FIG. 5 is an exploded three-dimensional perspective view of an embodiment of the invented adjustable bottle holder of FIG. 1. As shown in FIG. 5, the upper end 202 of the stem 212 of receiving base 200 defines a circular notch 203 on the stem's front face 205. FIG. 5 also shows a spring 220 (preferably made out of stainless steel) placed in an opening or a cavity of the slider cap, to bias against the button 230. The slider cap 210 is fixedly inserted into and snugly fits within the through-bore 204 on the upper end 202 of the stem 212.

In one embodiment of the invention, the slider cap 210 is provided with a neck capable of being received by the through-bore 204. It mates with the circular notch 203 on the upper end 202 of the stem 212 to define an opening on the front face 205 of the receiving base 200, the opening capable of receiving, housing, and supporting the button 230.

In one embodiment of the invention, the slider cap 210, as further shown in FIGS. 25-30, has a protruding section that, upon mating with the notch 203 of the stem 212 forms bullnose trim around the opening on the front face, for insertion of the button 230.

Figure 31:
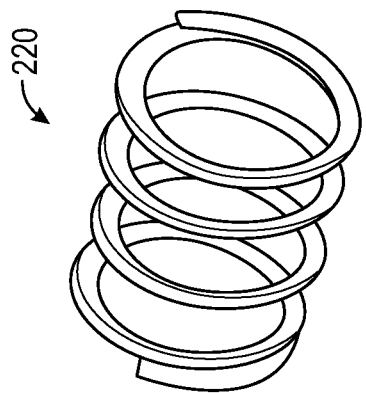
FIG. 31 is another three-dimensional perspective of an embodiment of the spring of the invented adjustable bottle holder of FIG. 1, viewed from a different angle than in FIG. 5.
Figure 30:
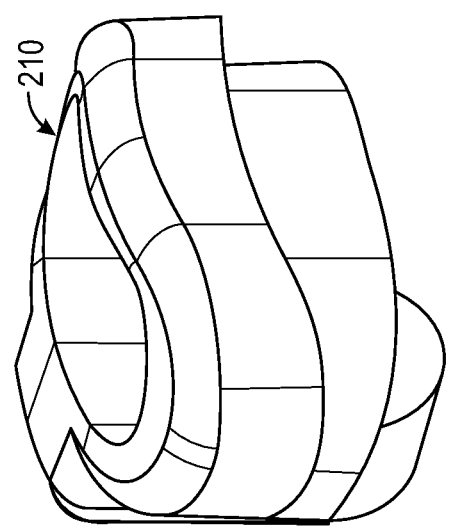
FIG. 30 is another three-dimensional perspective of an embodiment of the slider cap of the receiving base of the invented adjustable bottle holder of FIG. 1, viewed from a different angle than in FIG. 25.
Figure 34:
FIG. 34 is a front plan view of an embodiment of the strap of the invented adjustable bottle holder of FIG. 1.
Figure 35:
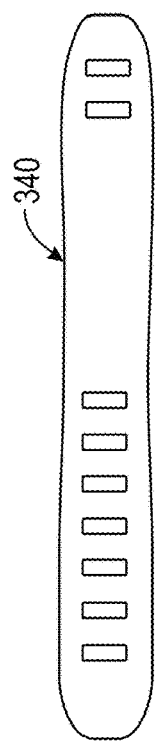
FIG. 35 is a bottom plan view of an embodiment of the strap of the invented adjustable bottle holder of FIG. 1.
Figure 37:
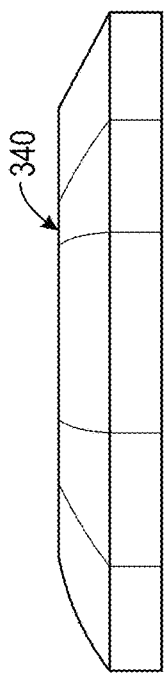
FIG. 37 is a side plan view of an embodiment of the strap of the invented adjustable bottle holder of FIG. 1.
Figure 36:
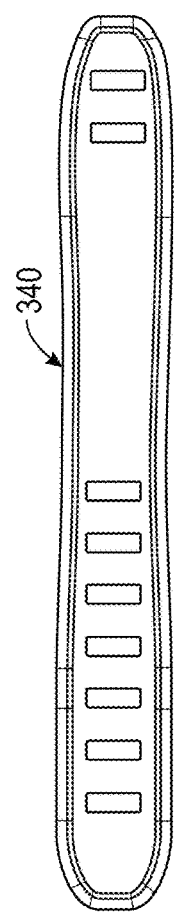
FIG. 36 is a top plan view of an embodiment of the strap of the invented adjustable bottle holder of FIG. 1.
Figure 33:
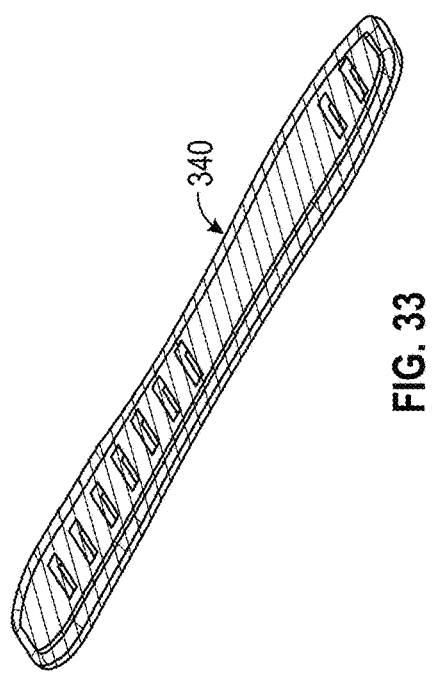
FIG. 33 is a three-dimensional perspective of an embodiment of the strap of the invented adjustable bottle holder of FIG. 1.

The button 230 is shown in more detail in FIGS. 21-24 and 32. FIGS. 21, 23-24, and 32, show that the button 230 is provided with a T-shaped pin 232 and the spring 220. Upon assembly of the adjustable bottle holder 10, i.e., by inserting the telescoping bottle supporting shaft 300 into the through-bore 204 of the stem 212 of the receiving base 200, the spring 220 (also shown in FIG. 31) and the T-shaped pin 232 become a part of the mechanism for adjusting and locking into place the height of the adjustable bottle holder.

The lower end 201 of the of the stem 212 of the receiving base 200 is provided with two diametrically opposed semi-circular notches. A flange 207 of the stand 211 surrounds the entire perimeter of the lower end 201 of the stem 212.

The lower end 201 of the stem 212 passes through the stand 211 portion of receiving base 200 and comes out on the underside of the stand 211. A bottom cover 240 (see, e.g., FIGS. 16-20) attaches to the bottom of the lower end 201 of the stem 212. The bottom cover 240 is shown from various perspectives in FIGS. 16-20. As shown in these figures, the bottom cover has an upper smooth surface (see FIG. 18), a bottom ribbed surface 242, and two diametrically opposed wings 244. The bottom cover 240 is inserted into the bottom end of the through-bore 204 of the stem 212 of the receiving base 200, such that the cover's bottom ribbed surface 242 is facing outwardly and away from the through-bore 204 of the stem 212, sealing the through-bore 204 to form a cavity within the receiving base 200. The two diametrically opposed wings 244 mate with the two diametrically opposed semi-circular notches to form drain holes 208 (see FIGS. 1-2) of the receiving base 200, the stem of which has been closed at one end. The flange 207 and the bottom ribbed surface 242 of the bottom cover 240 serve as additional support (foundation) for the over-molded suction cup 250 fixedly attached over the flange 207 and throughout the entire ribbed surface of the bottom cover 240 inserted in the bottom end of the through-bore 204.

The receiving base 200 may be formed using over-molding processes known in the art of over-molding components. Over-molding allows two different materials to be attached without glues or fasteners. In the present inventions, the bottom end 201 of the stem 212 of the receiving base, sealed by the bottom cover 240 with its bottom ribbed surface 242 facing outward, all are made of hard (rigid) materials, such as hard plastic that form the substrate for the over-molding. It is placed into a suction cup shaped mold. Thereafter, an over-molding material, such as TPE, is formulated for necessary softness and color and injected into the mold. The over-molding material flows into and all over the bottom ribbed surface 242 and over the flange 207. After the over-molding material has set, the mold is separated and the receiving base 200 removed from the mold, now having a soft suction cup in place. The over-molding material formulation and molding process ensures that the soft suction cup 250 is inseparable from the hard plastic of the receiving base 200.

The bottle supporting shaft 300 in FIG. 5, which is shown in more detail in FIGS. 10-15) has a hard, lower portion 310 and a flared cradle-shaped upper end 320. An elastic neck portion 330 is over-molded to the lower portion 310 on the one hand, and to the flared cradle-shaped upper end 320 on the other hand. The flared cradle-shaped upper end 320, the upper surface of which also includes over-molding, will securely hold the feeding bottle in place. As shown in FIG. 2, the flared cradle-shaped upper end 320 is tilted at an upward obtuse angle from vertical axis of the neck 330.

As discussed above, the neck 330 of the telescoping bottle supporting shaft 300 of an embodiment of FIG. 1, may further comprise one or more slots for better support, bending and twisting of the neck portion 330, over-molded to the lower portion 310 of the shaft 300 and to the angularly positioned flared cradle-shaped upper end 320 of the shaft 300.

In one embodiment, the slots may pass all the way through the neck portion, either from front-to-back or from-side-to-side. In another embodiment, the slots may not pass all the way through the neck portion, but instead may be formed in the neck on one or more opposing faces or sides of the shaft 300, e.g., front face, back face, left side, or right side of the shaft 300. Also, an embodiment where one or more slots pass all the way through the neck portion 330, while one or more other slots do not, is also contemplated by the present invention.

Furthermore, in addition to having different slots on different faces and sides of the neck portion, the slot width, length, or profile along any side or face, as well as depth, could vary.

Figure 12:
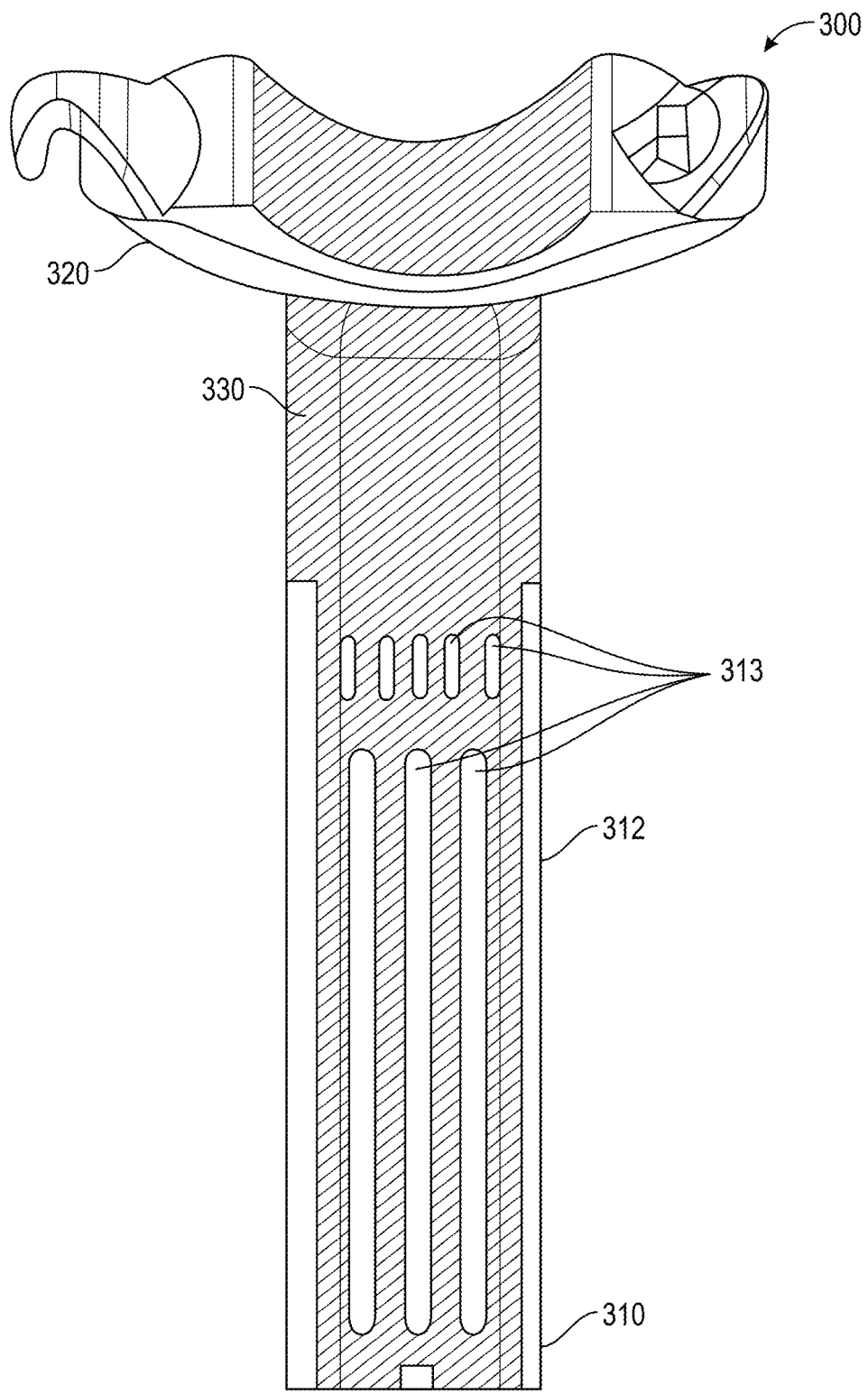
FIG. 12 is a back plan view of an embodiment of the telescoping shaft of the invented adjustable bottle holder of FIG. 1.
Figure 13:
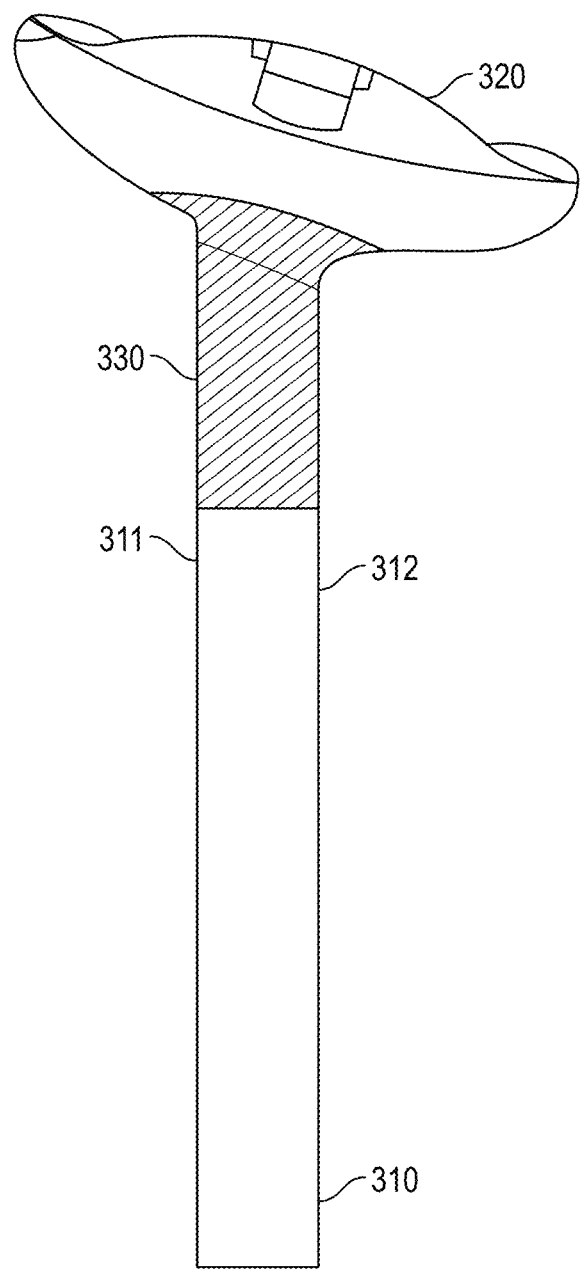
FIG. 13 is a side plan view of an embodiment of the telescoping shaft of the invented adjustable bottle holder of FIG. 1.
Figure 15:
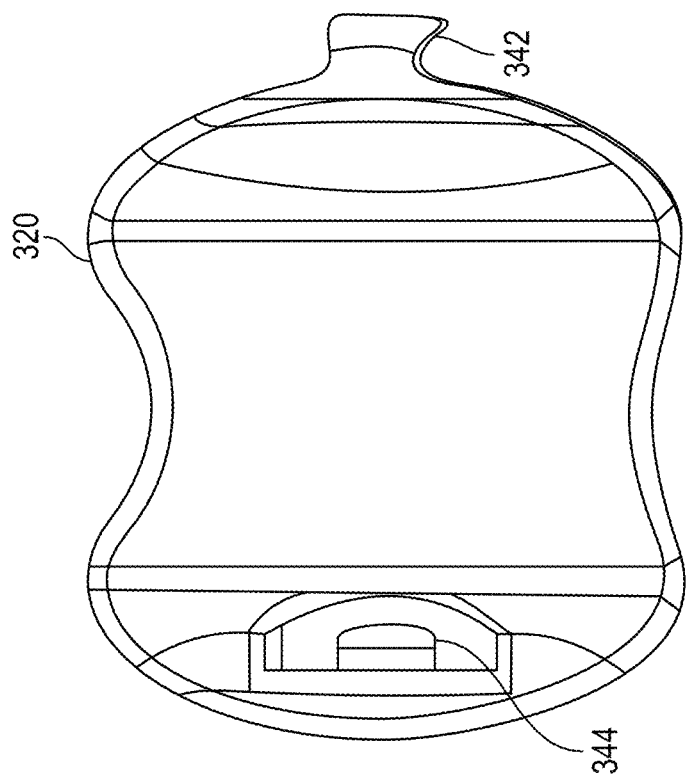
FIG. 15 is a top plan view of an embodiment of the telescoping shaft of the invented adjustable bottle holder of FIG. 1.
Figure 14:
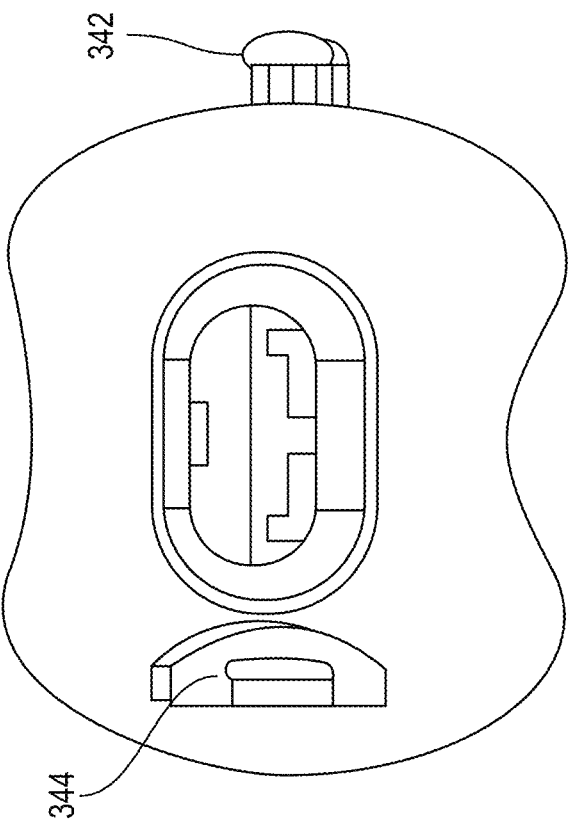
FIG. 14 is a bottom plan view of an embodiment of the telescoping shaft of the invented adjustable bottle holder of FIG. 1.
Figure 17:
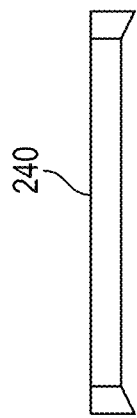
FIG. 17 is a side plan view of an embodiment of the bottom cover of the receiving base of the invented adjustable bottle holder of FIG. 1.
Figure 20:
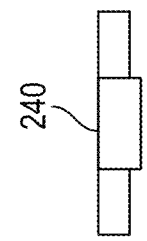
FIG. 20 is another side plan view of an embodiment of the bottom cover of the receiving base of the invented adjustable bottle holder of FIG. 1.
Figure 19:
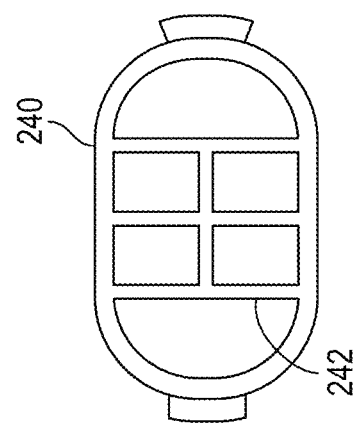
FIG. 19 is a bottom plan view of an embodiment of the bottom cover of the receiving base of the invented adjustable bottle holder of FIG. 1.
Figure 16:
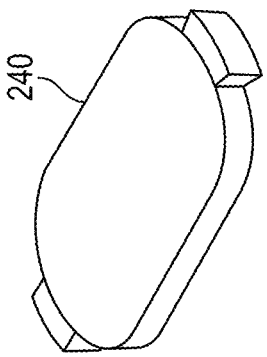
FIG. 16 is a three-dimensional perspective of an embodiment of the bottom cover of the receiving base of the invented adjustable bottle holder of FIG. 1.
Figure 18:
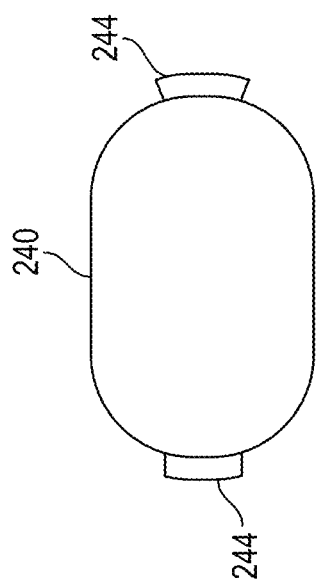
FIG. 18 is a top plan view of an embodiment of the bottom cover of the receiving base of the invented adjustable bottle holder of FIG. 1.
Figure 21:
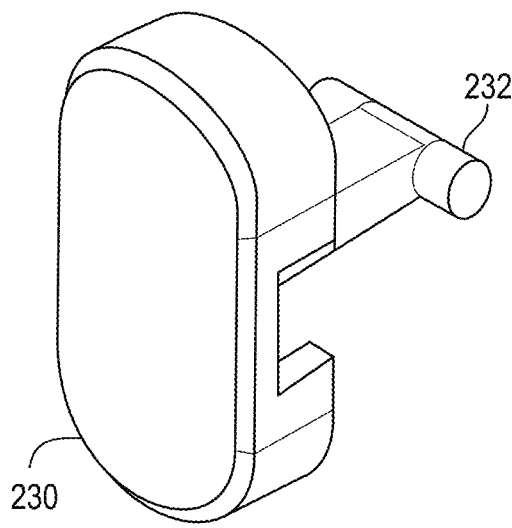
FIG. 21 is a three-dimensional perspective of an embodiment of the button of the invented adjustable bottle holder of FIG. 1.
Figure 22:
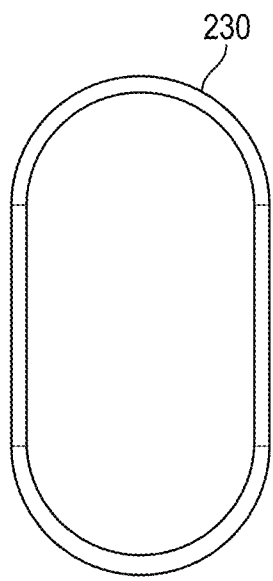
FIG. 22 is a front plan view of an embodiment of the button of the invented adjustable bottle holder of FIG. 1.
Figure 23:
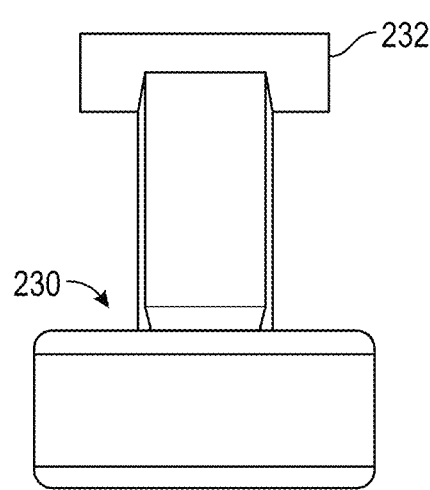
FIG. 23 is a top plan view of an embodiment of the button of the invented adjustable bottle holder of FIG. 1.
Figure 24:
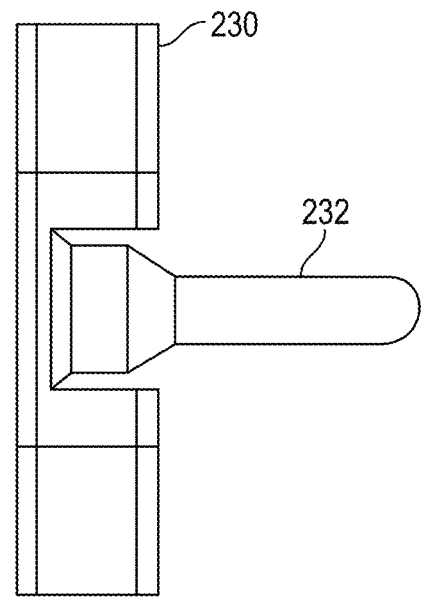
FIG. 24 is a side plan view of an embodiment of the button of the invented adjustable bottle holder of FIG. 1.
Figure 32:
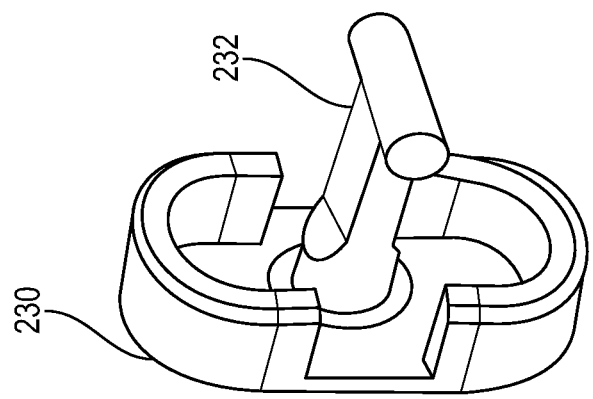
FIG. 32 is another three-dimensional perspective of an embodiment of the button of the invented adjustable bottle holder of FIG. 1, viewed from a different angle than in FIGS. 5 and 21.

FIG. 12 illustrates one or more hard plastic ribs 313 on one face of the shaft 300, in this case the back face. The ribs need not be the same size or even symmetrical along the face.

Figure 11:
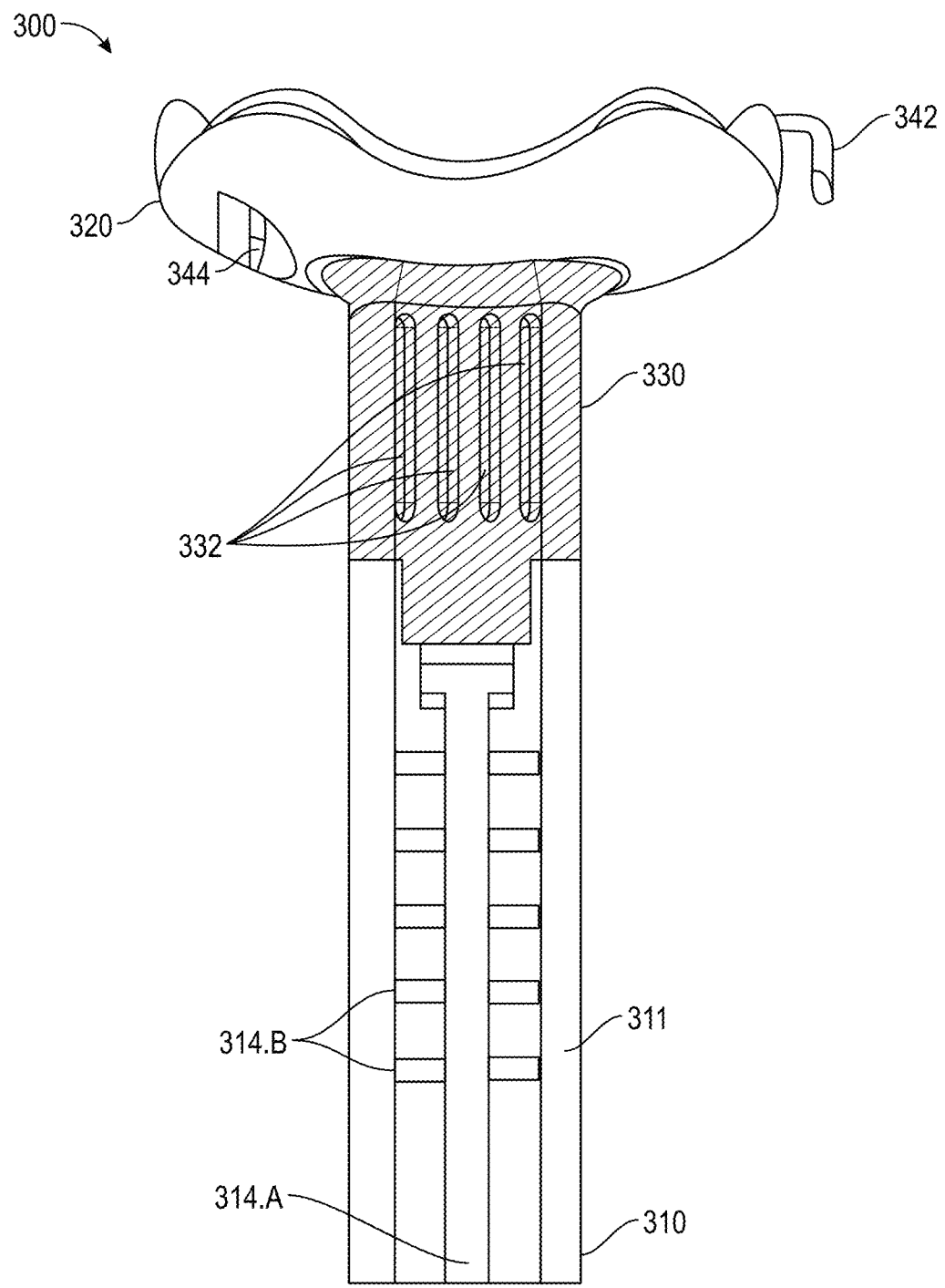
FIG. 11 is a front plan view of an embodiment of the telescoping shaft of the invented adjustable bottle holder of FIG. 1.

As shown in FIG. 11, the front face 311 of the shaft 300 is provided with a vertical track 314.A interspaced with horizontal notches 314.B, capable of receiving the t-shaped pin 323 of the button 230, and at least one slot 332 on the elastic (resilient) spring-like flexible neck portion 330 above the vertical track 314.A, to allow for torsion and bending. The horizontal notches 314.B provide resolution for height-adjustment steps along the shaft for cooperation with the T-shaped pin 232 of the button 230. The lower end 310 of the shaft 300 is configured to be inserted in the through-bore 204 of the stem 212 of the receiving base 200 in FIG. 1, such that the telescoping bottle supporting shaft 300 is supported by and can adjustable telescope vertically in and out of the stem 212 of the receiving base 200. This allows positioning the flared cradle-shaped upper end 320 of the shaft, upon which a bottle can be deposited and secured, e.g., fastened, using the strap 340 (shown in more detail in FIGS. 33-37), at any height comfortable for the user. This way, the user can access the bottle, bend or twist the neck of the shaft to drink from the bottle, and then, upon release, the neck of the adjustable bottle holder can spring back to an unbiased position, to prevent the spillage of the bottle's contents.

The lower portion 310 of the telescoping shaft 300 and the hard shell designed to form the flared cradle-shaped upper end 320 are both made of hard material, preferably hard plastic. Like the receiving base 200, the telescoping shaft 300 may be formed using over-molding processes known in the art of over-molding components. As discussed above, over-molding allows two different materials to be attached without glues or fasteners. In one embodiment of the present invention, when the lower end 310 of the telescoping shaft 300 and the hard shell designed to form the flared cradle-shaped upper end 320 are both made of hard plastic, the plastic forms the substrate for the over-molding process. They are placed into an appropriately shaped mold. Thereafter, the TPE is formulated for necessary softness and color and injected into the mold. The TPE flows into and all over the surfaces that are to be bound together. The ribs 313 protruding on the back face 312 of the telescoping shaft 300 (see FIG. 12) provide additional attachment points (surface along the protruding sides of each rib) for the TPE to bind with. The ribs 313 can vary in size, shape, and number. After the TPE has set, the mold is separated and the telescoping shaft 300 is removed from the mold having a soft pliable bendable neck with spring-like (elastic) characteristics. The TPE formulation and molding process ensures that the neck portion 330 is inseparable from the hard, plastic portions of the telescoping shaft 300.

Figure 38:
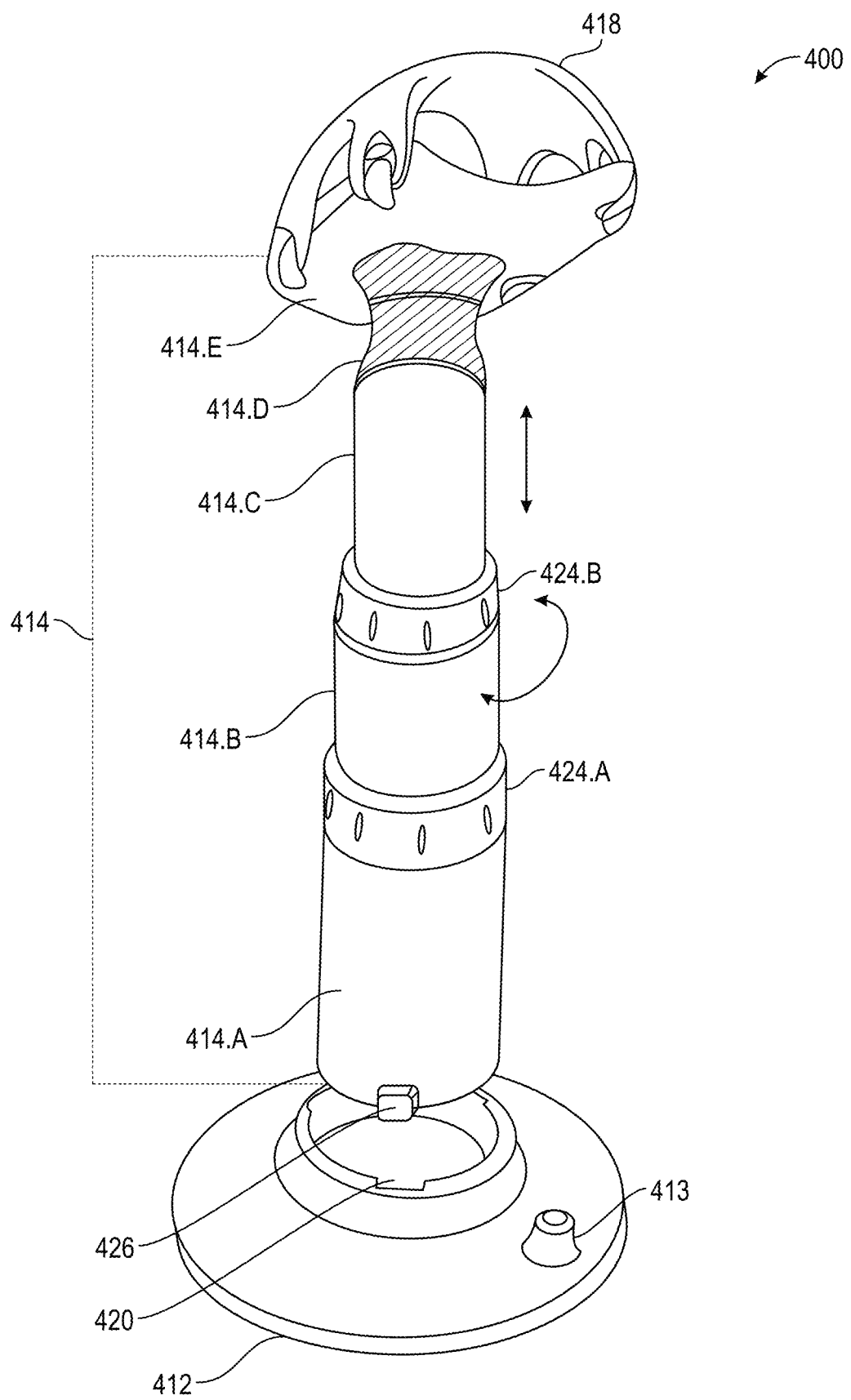
FIG. 38 as a perspective view another embodiment of the invented adjustable bottle holder.

FIG. 38 generally depicts a perspective view of another embodiment of the invented adjustable bottle holder. The adjustable bottle holder 400 of FIG. 38 is configured to support a feeding bottle and can be secured on a supporting surface (not shown) for easy access of the feeding bottle by its intended user. The bottle holder 400 comprises a receiving base 412, an adjustable multi-sectional telescoping shaft 414, a cradle-shaped bottle rest 414.E at the top end of the shaft 414, and a bottle securing stretchable cover 418. In one embodiment of the invention, the receiving base 412 includes a suction cup on the bottom, such that the bottle holder 400 can be securely attached to a flat supporting surface (not shown) by suction. Similar to the bottle holder embodiment of FIG. 1, when the receiving base of the bottle holder 400 is attached to the supporting surface via suction, it may include a suction seal-breaking tab, shown in FIG. 38 as reference 413. In contrast to the bottle holder 10 of FIG. 1, however, where the receiving base 200 comprises both the stand 211 and the stem 212, which are not detachable from each other, the receiving base 412 of the bottle holder 400 includes a stand portion only, with the lower section 414.A of the multi-section shaft 414 being detachable from the stand portion, and effectively replacing the stem 212 of the bottle holder embodiment in FIG. 1.

The adjustable, multi-sectional telescoping shaft 414 may include two or more shaft sections. In the embodiment of FIG. 38, the detachable multi-sectional telescoping shaft is shown as including three sections; a lower section 414.A, a middle section 414.B, and an upper section 414.C. At least one of the sections includes an elastic portion 414.D, to allow bending or twisting of the shaft, in order to be able to move a feeding bottle, secured in the bottle holder, to a comfortable position to a user for accessing the bottle's contents. Although the different shaft sections can have various cross-sectional shapes, e.g., rectangular, square, etc., in the embodiment of FIG. 38 the shaft sections have tubular profile with incrementally decreasing radius from the lower section 414.A, to the middle section 414.B, to the upper section 414.C. This allows for telescoping of the shaft, where the upper section 414.C can slide in and out (down and up) of the middle section 414.B, which in turn can slide in and out (up and down) of the lower section 414.A. The shaft 414 also includes two rotatable shaft-height-adjustment locking rings 424.A and 424.B that are used to adjust the height of the shaft 414, and of the overall bottle holder 400. The locking ring 424.A is used to fix position of the shaft's middle section 414.B with respect to the shaft's lower section 414.A; and the locking ring 424.B is used to fix a vertical position the shaft's upper section 414.C relative to the shaft's middle section 414.B. Fixing of the positions is accomplished by rotating the locking rings in a predetermined direction, e.g., clockwise, until they lock their associated shaft sections to each other. Rotating the locking rings in the other direction, e.g., counterclockwise, will loosen their associated shaft sections. Accordingly, by loosening the shaft sections with respect to each other, the sections can be slid (moved) up and down until a desired overall height of the bottle holder 400 has been achieved. Once the desired overall height of the device has been achieved, the locking rings are rotated in the opposite direction to secure their associated shaft sections with respect to each other. By allowing the height of the shaft to be adjusted, the user can adjust the overall height of the bottle holder 400 to whatever height is necessary for the user to access the bottle and the contents of the bottle supported by the adjustable bottle holder. In addition, the sections of the shaft can be slid into one another, to collapse the shaft, or separated altogether for device's disassembly.

The receiving base 412 has an opening (through-bore) in the center of its upper surface, into which the bottom end of the lower section 414.A of the multi-sectional telescoping shaft 414 gets inserted during assembly of the bottle holder 400. The receiving base 412 has one or more notches 420, positioned around the perimeter of the opening, that are configured to accommodate one or more protrusions 426 at the bottom end of the lower shaft section 414.A. To assemble the shaft 414 to the base 412, one inserts the protrusion(s) 422 of the lower shaft section 414.A into the notch(es) 420 and rotates the shaft section 414.A within the base's opening until the shaft section 414.A becomes securely attached to the base 412.

In the depicted embodiment of FIG. 38, above the flexible (bendable, twistable, or both) neck portion 414.D, which is elastic, the upper section 414.C of the shaft 414 has a flared cradle-shaped upper end 414.E. The flared cradle-shaped upper end 414.E is tilted at an upward obtuse angle from the vertical axis of the neck portion 414.D, to prevent spillage of bottle contents when the shaft 414 is in an unbiased position.

A stretchable, parachute-like cover 418, is detachably attached to the flared cradle-shaped upper end 414.E by any appropriate attachment mechanism, such as hooks, and together with it can securely hold bottles of various diameters on top of the cradle-shaped upper end 414.E. As shown in the embodiment of FIG. 38, the cover 418, which functionally corresponds to the strap 340 in the embodiment of FIG. 1, may attach to the flared cradle-shaped upper end 414.E at more than two attachment points. FIG. 38 depicts two attachment points on each side of the flared cradle-shaped upper end 414.E. The attachment procedure itself can be similar to the procedure described with respect to attachment of the strap 340 of the bottle holder embodiment of FIG. 1. Alternatively, the single cover 418 can be replaced to two separate straps, each having two attachments points as described regarding the strap 340.

Design of the neck portion 414.D and its method of attachment to the portion of the upper shaft section 414 on the one end (below) and to the flared cradle-shaped upper end 414.E on the other end (above), which is illustrated by cross-hatching in FIG. 38, can be done in a similar way as described with respect to the elastic neck portion 330 of the bottle holder embodiment of FIG. 1. Accordingly, a bottle holder embodiment with a detachable shaft would comprise at least two separable sections, with at least one hard (rigid) section and at least one telescoping section, where a telescoping section includes an elastic portion that can be bent or twisted by a user, yet returns to its original shape when the user releases the device.

Because the shaft 414 is collapsible and detachable from the receiving base 412, the bottle holder 400 can be used in portable applications, in applications where storage space is at a premium, or where cleaning of the device requires disassembly.

Figure 39:
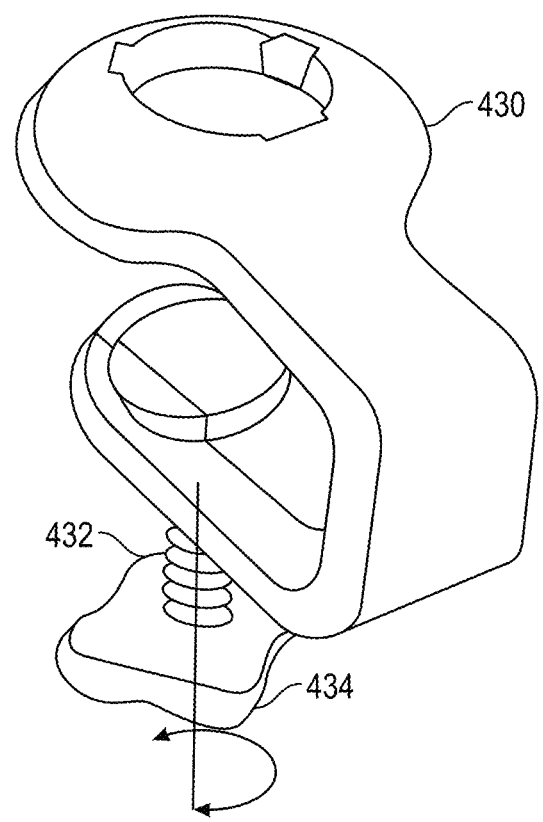
FIG. 39 is a perspective view of another embodiment of the receiving base of the adjustable bottle holder of FIG. 38.

FIG. 39 is a perspective view of another embodiment of the receiving base of the collapsible and adjustable bottle holder of FIG. 38. In FIG. 39, the receiving base 430 is a C-clamp type base. The C-clamp type receiving base 430 securely attaches to an edge of a table/feeding surface with the help of the bottom screw mechanism 432 via its handle 434. The top receiving surface of the base 430 supports and secures the lower shaft section 414.A of the shaft in the same manner as the receiving base 412 in FIG. 38.

In another embodiment, if the supporting surface is metallic, the receiving base could include a magnet at its bottom surface, such that instead of suction, the adjustable bottle holder would be secured to the supporting surface by a magnetic force.

Although the above description discusses various embodiments, many of elements of the discloses embodiments may be interchangeable as appropriate. For example, the neck portion 414.D may have slots or ribs, the stretchable cover attachment mechanism in FIG. 38 can be the same as in FIG. 1, etc.

Although in a preferred embodiment the shaft extends vertically along an axis at 90 degrees from the receiving base and its horizontal supporting surface, the invention contemplates having the shaft extend at an angle from the vertical axis. In such a case, the angle of the flared cradle-shaped upper end 320 of the telescoping shaft 300 in FIG. 1, as well as upper end 414.E of the shaft 414 in FIG. 38, can be adjusted accordingly. In fact, as long as the overall design results in the bottle being secured by the invented device in an unbiased state at an angle that prevents spillage of the bottle's contents, the angles of the individual system components with respect to vertical axis can be varied.

Although particular embodiments of the invention have been illustrated and described in detail herein, they are provided by way of illustration only and should not be construed to limit the invention. Since certain changes may be made without departing from the scope of the present invention, it is intended that all matter contained in the above description or shown in the accompanying drawings be interpreted as illustrative. Practitioners of the art will realize that the sequence of steps and the embodiments depicted in the figures can be altered without departing from the scope of the present invention and that the illustrations contained herein are singular examples of the multitude of possible depictions of the present invention.

Moreover, in this document, relational terms such as first and second, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes or contains a list of elements does not include only those elements but may include other elements not expressly listed or inherent to such process, method, article, or apparatus. An element proceeded by "comprises . . . a", "has . . . a", "includes . . . a" or "contains . . . a" does not, without more constraints, preclude the existence of additional identical elements in the process, method, article, or apparatus that comprises, has, includes or contains the element. The terms "a" and "an" are defined as one or more unless explicitly stated otherwise herein. The terms "substantially" "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way but may also be configured in ways that are not listed.

The Abstract is provided to allow the reader to quickly ascertain the nature of the technical disclosure. It is submitted with the understanding that it will not be used to interpret or limit the scope or meaning of the claims. In addition, in the foregoing Detailed Description, various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed:

1. A bottle holder comprising:
   a base configured for detachable affixing to a supporting surface;
   a vertical shaft coupled to said base,
   said vertical shaft comprising an elastic portion at an upper end of said vertical shaft, said elastic portion configured to be in a biased state when a force is applied, said vertical shaft having a longitudinal axis that passes through said elastic portion when said elastic portion is an unbiased state; and
   a bottle rest coupled to said elastic portion;
   wherein said elastic portion allows rotation of said bottle rest around the longitudinal axis; and
   wherein said elastic portion returns from the biased state to the unbiased state when the force is removed.

2. The bottle holder of claim 1, wherein said vertical shaft is detachable from said base.

3. The bottle holder of claim 1, wherein said bottle rest is movable vertically with respect to said base.

4. The bottle holder of claim 1, further comprising a locking mechanism coupled to said vertical shaft, said locking mechanism enabling adjustment of a length of said shaft.

5. The bottle holder of claim 4, wherein said locking mechanism comprises a locking ring.

6. The bottle holder of claim 1, further comprising a fastener configured to secure a feeding bottle to said bottle rest.

7. The bottle holder of claim 6, wherein said fastener is a stretchable strap.

8. The bottle holder of claim 1, wherein, in the unbiased state of said elastic portion, said bottle rest is configured to support a feeding bottle at an angle sufficient to prevent spillage of a liquid from the feeding bottle.

9. The bottle holder of claim 1, wherein said base is configured to be detachably affixed to the supporting surface via a suction, a magnetic field, or a screw.

10. A method of using a bottle holder comprising a receiving base and a vertical telescoping shaft, said vertical telescoping shaft comprising an elastic portion at an upper end of said vertical telescoping shaft and a bottle rest above said elastic portion, said elastic portion configured to be in a biased state when a force is applied, said vertical telescoping shaft having a longitudinal axis that passes through said elastic portion when said elastic portion is an unbiased state; wherein said elastic portion returns from the biased state to the unbiased state when the force is removed, and wherein said elastic portion allows rotation of said bottle rest around the longitudinal axis, said method comprising the steps of:
   affixing said receiving base to a supporting surface;
   coupling said telescoping shaft to said receiving base;
   securing a feeding bottle to said bottle rest;
   adjusting a length of said telescoping shaft; and
   flexing said elastic portion of said telescoping shaft to reorient the feeding bottle.

11. The method of claim 10, wherein the step of adjusting a length of said vertical telescoping shaft further comprises the step of moving said bottle rest with respect to said receiving base along the longitudinal axis.

12. The method of claim 11, further comprising the step of using a locking mechanism to secure a position of said bottle rest above said receiving base once the length of said vertical telescoping shaft has been adjusted.

13. A bottle holder comprising:
- a base having an upper end and a lower end, the lower end configured for detachable attachment to a supporting surface;
- a vertical telescoping shaft detachably coupled to said base, said vertical telescoping shaft comprising an at least one rigid section and another section having an elastic portion at an upper end of said vertical telescoping shaft, said elastic portion configured to be in a biased state when a force is applied, said vertical telescoping shaft having a longitudinal axis that passes through said elastic portion when said elastic portion is an unbiased state; and
- a bottle rest coupled to said elastic portion;
- wherein said elastic portion returns from the biased state to the unbiased state when the force is removed, and wherein said elastic portion allows rotation of said bottle rest around the longitudinal axis.

14. The bottle holder of claim 13, wherein said elastic portion can be flexed.

15. The bottle holder of claim 13, further comprising a fastener configured to secure a feeding bottle to said bottle rest.

16. The bottle holder of claim 15, wherein said fastener is a stretchable strap.

17. The bottle holder of claim 15, wherein said fastener is adjustable.

18. The bottle holder of claim 13, wherein said vertical telescoping shaft further comprises a locking mechanism to enable adjusting of a length of said telescoping shaft.

19. The bottle holder of claim 13, wherein, when said elastic portion is in the unbiased state, said bottle rest is configured to secure a feeding bottle at an angle to said supporting surface.

20. The bottle holder of claim 13, wherein said base is configured to be detachably affixed to the supporting surface via a suction force, a magnetic field, or a screw.

* * * * *